United States Patent
Knott et al.

(10) Patent No.: US 11,760,470 B2
(45) Date of Patent: Sep. 19, 2023

(54) ROTORCRAFT LOCKOUT DURING TRANSPORT

(71) Applicant: Bell Textron Inc., Fort Worth, TX (US)

(72) Inventors: Kevin Knott, Arlington, TX (US);
Vitthal Vishnuthreeth Arakeri, Bangalore (IN); Alvin Jones, Arlington, TX (US); Scott David Poster, Arlington, TX (US); Steven Paul Pape, Grapevine, TX (US); Mark Adam Wiinikka, Hurst, TX (US)

(73) Assignee: Textron Innovations Inc., Providence, RI (US)

(*) Notice: Subject to any disclaimer, the term of this patent is extended or adjusted under 35 U.S.C. 154(b) by 312 days.

(21) Appl. No.: 17/306,303

(22) Filed: May 3, 2021

(65) Prior Publication Data
US 2022/0297830 A1    Sep. 22, 2022

(30) Foreign Application Priority Data
Mar. 20, 2021   (IN) .............................. 202121011952

(51) Int. Cl.
| B64F 1/12 | (2006.01) |
| B64F 5/50 | (2017.01) |
| B64C 27/605 | (2006.01) |
| B64C 27/82 | (2006.01) |
| B64C 27/35 | (2006.01) |

(52) U.S. Cl.
CPC .......... *B64C 27/605* (2013.01); *B64C 27/35* (2013.01); *B64C 27/82* (2013.01); *B64F 1/125* (2013.01); *B64F 5/50* (2017.01)

(58) Field of Classification Search
CPC .... B64F 5/50; B64F 1/125; B64F 1/22; B60P 3/11; B64C 27/50
See application file for complete search history.

(56) References Cited

U.S. PATENT DOCUMENTS

| 2,471,544 | A | * | 5/1949 | Ring | B64F 1/04 244/105 |
| 3,133,715 | A | * | 5/1964 | Grunfelder | B64C 27/50 244/17.11 |
| 4,296,898 | A | * | 10/1981 | Watson | B64F 1/12 244/53 A |
| 7,134,627 | B2 | * | 11/2006 | Warin | B64F 1/005 244/17.11 |

(Continued)

FOREIGN PATENT DOCUMENTS

| CN | 102390541 A | * | 3/2012 | |
| GB | 2471393 A | * | 12/2010 | ............. B64F 5/0009 |
| WO | WO-9219497 A1 | * | 11/1992 | ............. B64F 1/005 |

*Primary Examiner* — Justin D Seabe
(74) *Attorney, Agent, or Firm* — Bradley Arant Boult Cummings LLP

(57) ABSTRACT

An exemplary rotorcraft lockout system includes a main rotor lockout comprising a base operable to be attached to a bottom surface of a fuselage and a first and a second tension arm operable to be connected to the base and a main rotor hub, and a tail rotor lockout including a clamp operable to connect to a horizontal stabilizer, a rotor arm connector operable to connect to a tail rotor hub, and a tail rotor tension arm operable to interconnect the clamp and the rotor arm connector in tension.

20 Claims, 15 Drawing Sheets

(56) References Cited

U.S. PATENT DOCUMENTS

| | | | |
|---|---|---|---|
| 8,500,059 B2 * | 8/2013 | Beasley | B25B 9/02 |
| | | | 244/17.11 |
| 9,421,673 B2 * | 8/2016 | Dunmire | B64C 27/50 |
| 11,130,009 B2 * | 9/2021 | Thornton | A62B 35/0043 |
| 2007/0196210 A1 | 8/2007 | Carbaugh et al. | |
| 2018/0086444 A1 | 3/2018 | Poster et al. | |
| 2020/0001991 A1 | 1/2020 | Wiinikka et al. | |

\* cited by examiner

ROTORCRAFT LOCKOUT DURING TRANSPORT

CROSS-REFERENCE TO RELATED APPLICATIONS

This application claims priority from Indian Application No. 202121011952, filed Mar. 20, 2021, the entire contents of which are incorporated by reference in their entirety herein for all purposes.

TECHNICAL FIELD

This disclosure relates in general to the field of aircraft, and more particularly, but not by way of limitation, to a system and method for securing a rotorcraft's rotors and drivetrain during transit.

BACKGROUND

This section provides background information to facilitate a better understanding of the various aspects of the disclosure. It should be understood that the statements in this section of this document are to be read in this light, and not as admissions of prior art.

Aircraft are often transported to various locations via land, marine, and air carriers. Rotor components may be damaged during transit due to vibrations, either by excessive wear of the elastomeric or by excessive movements allowing rotor components to reach the limits of the prescribed motions and hitting the stops. During transit hydraulic pressure bleeds-off the hydraulic systems allowing the entire rotor head to collapse. Unsupported and un-restrained, the rotor head will move up and down due to vertical transit loads and cause damage to the swashplate and collective sleeve.

Rotorcraft vibration and bounce during transit damage rotor systems and drivetrain components such as gears through gear teeth chatter. Rotor components are damaged due hydraulic bleed-off. Rotor drivetrains on wheeled rotorcrafts cannot be locked-out by tying the rotorcraft to the transit vehicle due to landing gear bounce. Traditionally, drivetrain components are removed from the rotorcraft during transit.

SUMMARY

An exemplary rotorcraft lockout system includes a main rotor lockout comprising a base operable to be attached to a bottom surface of a fuselage of a rotorcraft and a first and a second tension arm operable to be connected to the base and a main rotor hub, and a tail rotor lockout including a clamp operable to connect to a horizontal stabilizer, a rotor arm connector operable to connect to a tail rotor hub, and a tail rotor tension arm operable to interconnect the clamp and the rotor arm connector in tension. The lockout system may further include a gearbox lockout having a tension arm interconnecting a first clamp and a second clamp, the first and second clamps operable to connect to adjacent gearbox driveshafts components. The lockout system may include a swashplate support including a plurality of blocks and a rigid beam for each adjacent pair of blocks, the swashplate support operable to be arranged in a circular configuration with the rigid beams interconnecting the adjacent pair of blocks with the swashplate support encircling a rotor mast between a swashplate and a main rotor gearbox.

An exemplary rotorcraft includes a fuselage, a main rotor gearbox (MRGB) connected by a mast to a main rotor hub, a swashplate connected to the main rotor hub, a first reduction gearbox (RGB) connecting a first engine to the MRGB through a first RGB driveshaft, a second RGB connecting a second engine to the MRGB through a second RGB driveshaft, a reduction gearbox lockout includes a first RGB clamp secured to the first RGB driveshaft and a second RGB clamp secured to the second RGB driveshaft and a RGB tension link interconnecting the first and the second RGB clamps in tension, a main rotor lockout having a base connected to a bottom surface of the fuselage a first tension arm connected to the main rotor hub and the base on a right side of the fuselage and a second tension arm connected to the main rotor hub and the base on the left side of the fuselage, and a tail rotor lockout having a tail rotor tension arm interconnecting the tail rotor hub and a horizontal stabilizer in tension.

An exemplary method for locking rotors and a drivetrain for transport of a rotorcraft, the rotorcraft includes fuselage, a main rotor gearbox (MRGB) connected to a main rotor hub by a mast, a swashplate connected to the main rotor hub, a tail rotor hub connected to the MRGB through a tail rotor driveshaft coupled to an intermediate gearbox and a tail rotor gearbox, a first reduction gearbox (RGB) connecting a first engine to the MRGB through a first RGB driveshaft, a second RGB connecting a second engine to the MRGB through a second RGB driveshaft, a first accessory gearbox (AGB) connected to the MRGB by a first AGB driveshaft, and a second AGB connected to the MRGB by a second AGB driveshaft. The exemplary method includes securing a main rotor against rotation, locking the first and second RGBs, locking the first and second AGBs, and securing a tail rotor (TR) against rotation. Securing the main rotor may include attaching a base to a bottom surface of the fuselage with a right end extending beyond a right side of the fuselage and a left end extending beyond a left side of the fuselage and one of the right end and the left end positioned forward of the mast and the other one of the right end and the left end positioned aft of the mast, connecting a first tension arm to the right end and to the main rotor hub, connecting a second tension arm to the left end and to the main rotor hub, and applying an equal load through the first tension arm and the second tension arm. Locking the first and second RGB s may include securing a first RGB clamp to the first RGB driveshaft, securing a second RGB clamp to the second RGB driveshaft, and interconnecting the first and the second RGB clamps in tension. Locking the first and second AGBs may include securing a first AGB clamp to the first AGB driveshaft, securing a second AGB clamp to the second AGB driveshaft, and interconnecting the first and the second AGB clamps in tension. Securing the tail rotor (TR) may include attaching a TR clamp to a horizontal stabilizer, attaching a TR tension arm to the TR clamp and the TR hub, and applying tension to the TR hub in an opposite direction of rotation of the TR hub.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
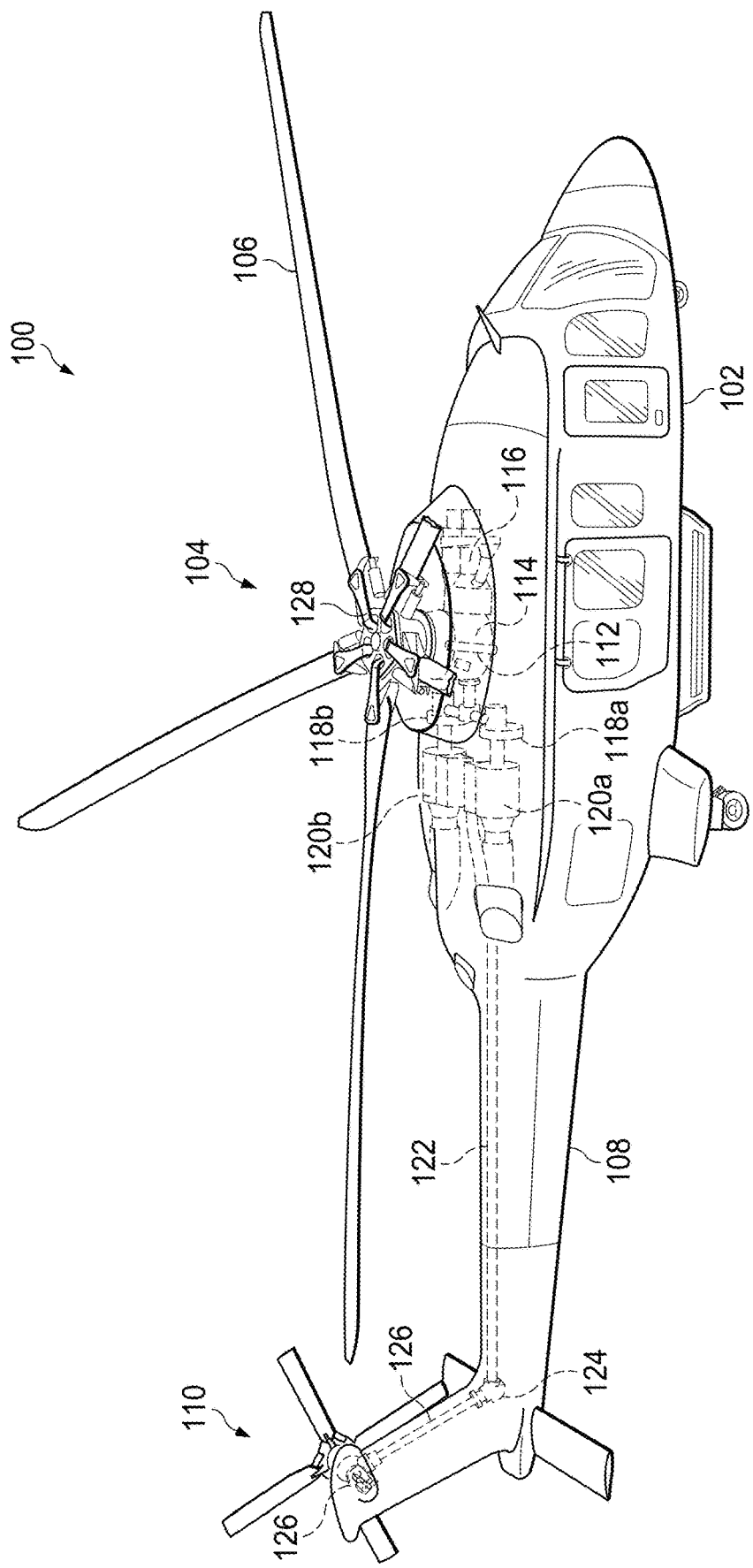
FIG. 1 is a schematic view of an exemplary rotorcraft illustrating the drivetrain and rotor system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 is a schematic illustration of an exemplary fly-by-wire rotorcraft 100, shown as a helicopter. Rotorcraft 100 has a fuselage 102 and a main rotor system 104 carried thereon. Rotor blades 106 are operably associated with main rotor system 104 for creating flight. A tail boom 108 is depicted that further includes tail rotor 110. The rotorcraft drive system includes a rotor mast 112 connected to the main rotor gearbox (MRGB) 114 and main rotor hub 128. MRGB 114 is connected to accessory gearboxes (AGB) 116 and engine reduction gearboxes (RGB) 118. RGBs 118a, 118b are connected respectively to engines 120a, 120b. In the illustrated exemplary rotorcraft 100, a tail rotor driveshaft 122 transmits mechanical rotation from MRGB 114 to tail rotor 110 through an intermediate gearbox 124 and a tail rotor gearbox 126. In an exemplary hybrid rotorcraft, the tail rotor may be driven by electric or hydraulic motors in place of a mechanical driveshaft connected to the MRGB.

Figure 2:
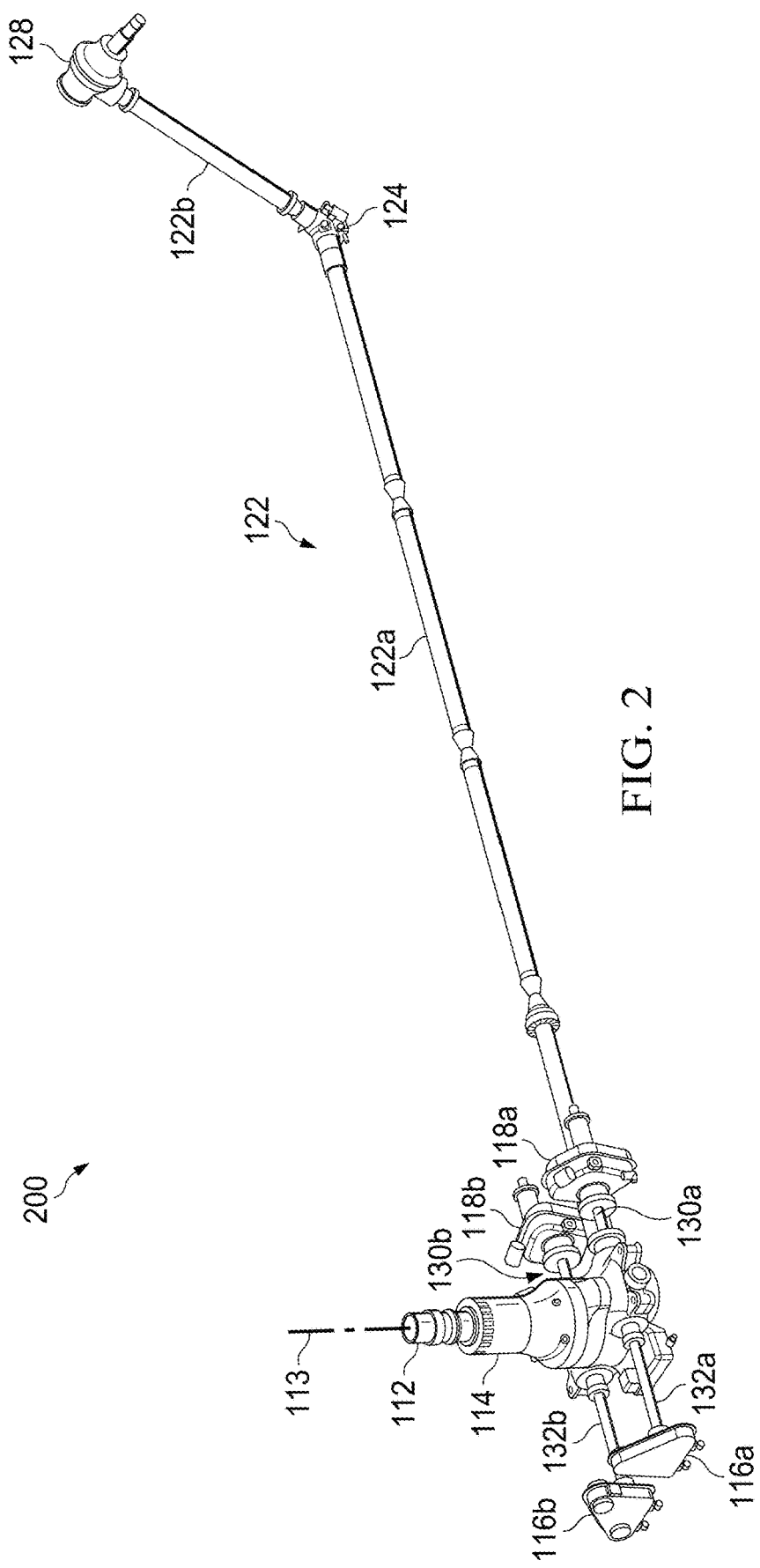
FIG. 2 illustrates in isolation an exemplary rotorcraft drive system.

FIG. 2 illustrates an exemplary drive system 200 of a rotorcraft such as illustrated in FIG. 1. Drive system 200 includes seven gearboxes and two rotor systems that need to be secured or locked-out when the rotorcraft is transported via land, marine, or air. A tail rotor driveshaft assembly 122 includes a first portion 122a extending from main rotor gearbox 114 to an intermediate gearbox 124 and a second portion 122b extending from intermediate gearbox 124 to tail rotor gearbox 126. Main rotor gearbox 114 is powered by two engine reduction gearboxes 118a, 118b, thereby providing redundant power to main rotor gearbox 114. Main rotor gearbox 114 drives mast 112 along rotational axis 113. Each engine reduction gearbox 118a, 118b is connected to main rotor gearbox 114 via reduction gearbox driveshafts 130a, 130b and each of the reduction gearboxes is connected to an engine (FIG. 1). Main rotor gearbox 114 is connected to accessory gearboxes 116a, 116b respectively through driveshafts 132a, 132b.

Figure 3:
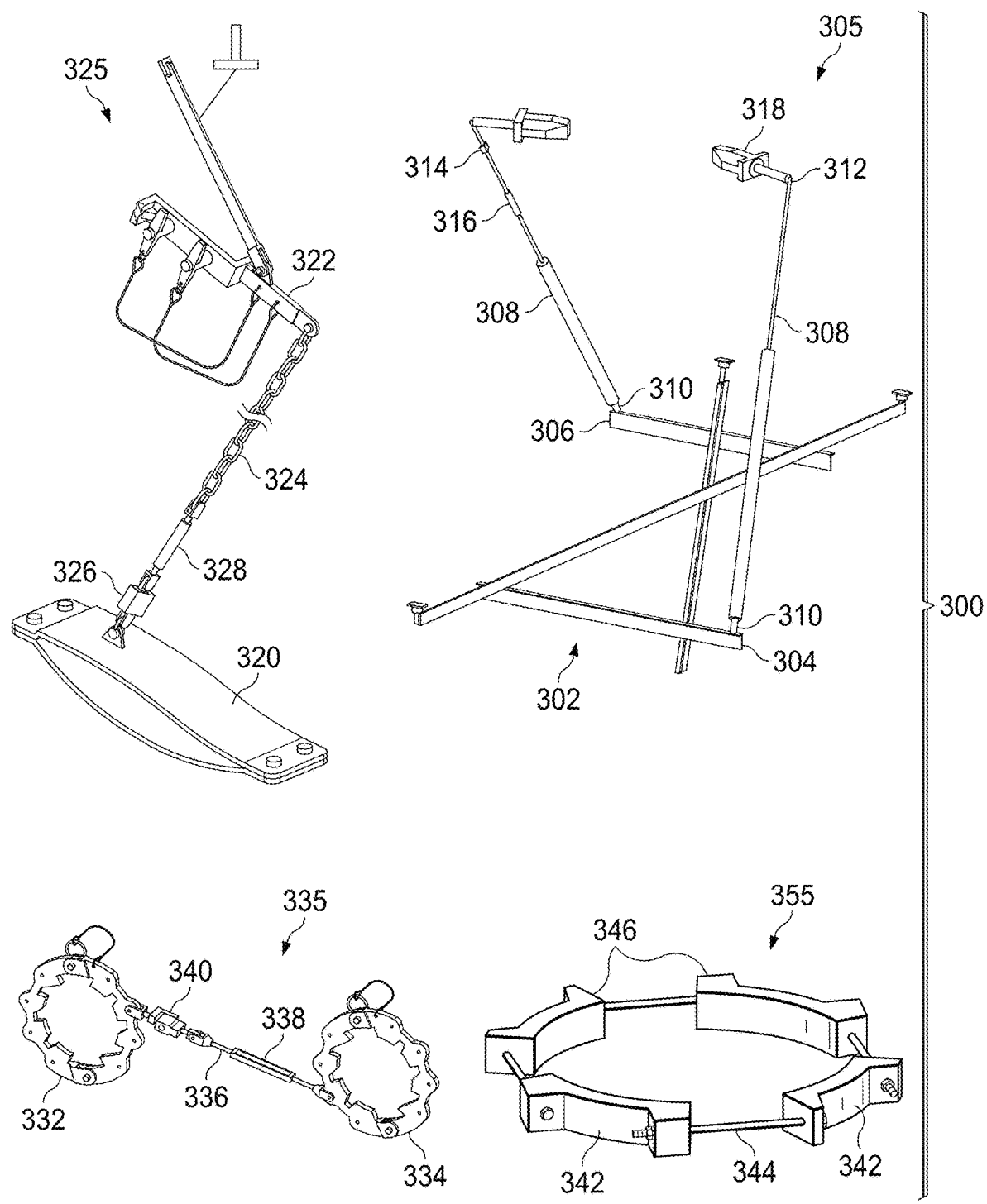
FIG. 3 illustrates an exemplary rotor and drivetrain lockout system of a rotorcraft.

FIG. 3 illustrates an exemplary rotorcraft lockout system generally denoted by the numeral 300. Lockout system 300 provides a mechanism to secure the rotor system and drivetrain during land, marine, and air transport to prevent damage to the various rotor components and the drivetrain. Lockout system 300 is configured in particular for a fly-by-wire rotorcraft, such as the Bell 525, where the main and tail rotor hubs are free to rotate during transport. Lockout system 300 further provides a mechanism to lock the drivetrain, e.g. drive system 200, and reduce gear teeth chatter and mitigate brinelling. According to aspects of the disclosure, lockout system 300 provides a mechanism for securing the rotor hubs and drivetrains without disassembly of the drive system.

Exemplary lockout system 300 includes a main rotor or main rotor gearbox lockout 305, a tail rotor lockout 325, one or more gearbox lockouts 335, and a swashplate support 355. Lockout system 300 is generally described with additional reference to FIGS. 1-3. Gearbox lockouts 335 may have different dimensions and configured to secure and lockout for example the engine reduction gearboxes and the auxiliary gearboxes. All of the lockouts and the swashplate support are installed and secured on the aircraft preventing relative motion between the lockout components and the aircraft. The lockout system locks the entire drivetrain preventing rotor turning and gear teeth chatter along the drivetrain, from the main rotor components, accessory gearboxes, to the tail rotor system.

Main rotor lockout 305 includes a base 302 operable to connect to the bottom of the fuselage so that the base is stationary relative to the fuselage. The base includes a first end 304 and a second end 306, the first and second ends 304, 306 are located on opposite lateral sides and forward and aft ends of the base from one another. Main rotor lockout 305 includes a pair of tension arms 308 that are identical to each other. Each tension arm 308 includes a base end 310 attachable to base 302 at one of the first or second base ends 304, 306 and a hub end 312 connectable to the main rotor hub in the place of a removed blade. Tension arms 308 include a load cell 314 and a length adjustable coupler 316, e.g. turnbuckle. The tension arms may be constructed of wire rope, cable, chain, and rods, or other members that do not stretch. Hub end 312 may include or be connectable to the main rotor hub by an adapter member 318 that will position the tension arm away from the side of the fuselage.

Tail rotor lockout 325 includes a clamp 320, a rotor arm connector 322, and a tension arm 324 having a load cell 326 and a length adjusting coupler 328. Clamp 320 is configured to connect to the tail boom, for example a horizontal stabilizer. Rotor arm connector 322 is operable to attach to the tail rotor hub in place of a removed rotor blade. Tension arm 324 is connectable between clamp 320 and rotor arm connector 322 to apply tension to the rotor arm connector in the opposite direction of rotation of the tail rotor hub.

Figure 11:
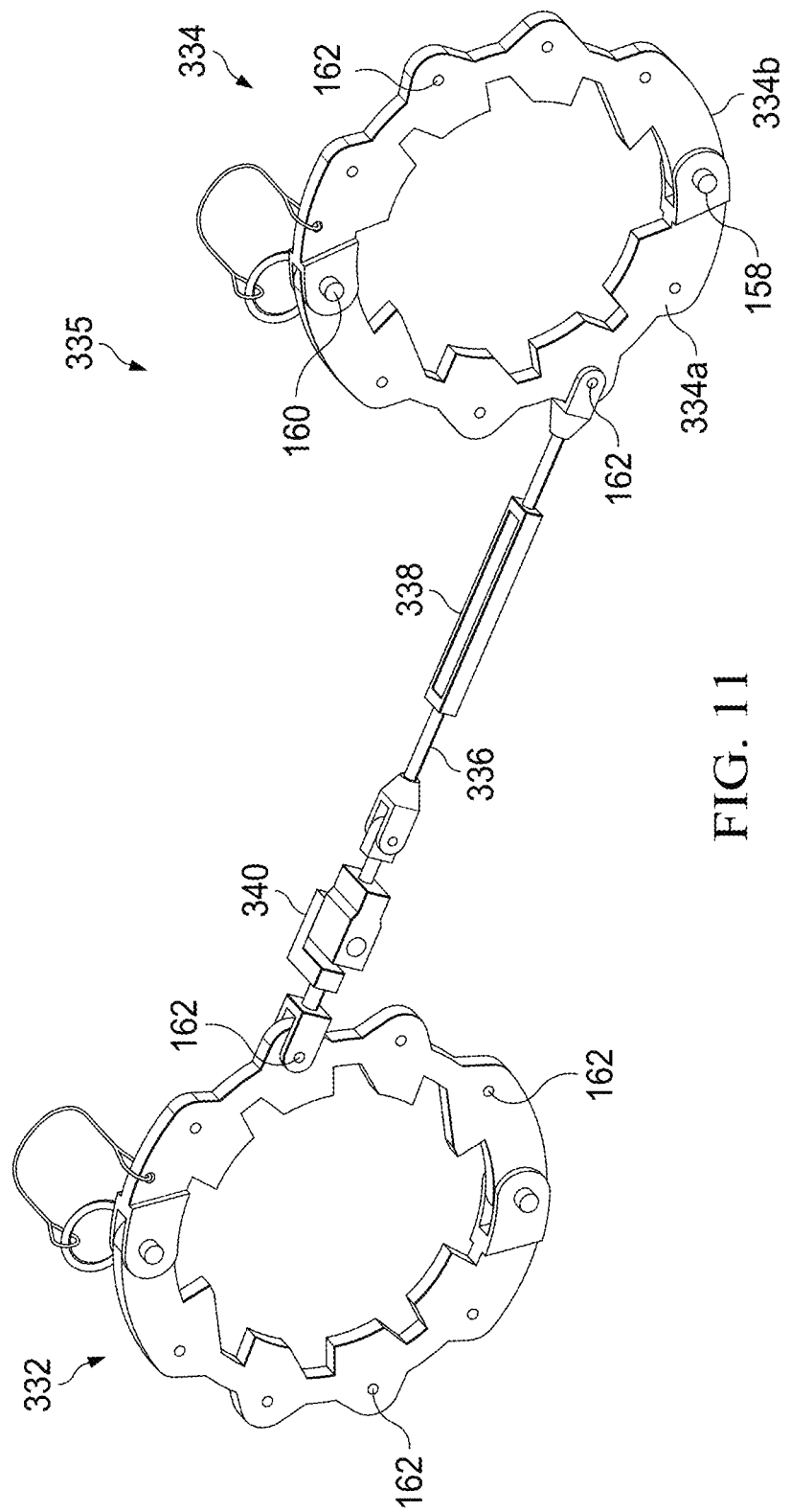
FIG. 11 illustrates an exemplary gearbox lockout according to aspects of the disclosure.

Gearbox lockouts 335, also shown in FIG. 11, include a pair of clamps 332, 334 and a tension arm 336 to interconnect clamps 332, 334. Each clamp 332, 334 may be sized and shaped to fit and to be secured to a gearbox driveshaft component, e.g. such as the attach flanges or quills. Clamps 332, 334 are constructed in two or more sections such that the clamp can be positioned to encircle a gearbox driveshaft component without disassembly of the drive system. Tension arm 336 is connectable to the pair of clamps and a length adjustable coupler 338 is operable to apply a load the pair of clamps. The adjacent gearbox driveshafts rotate in opposite directions and the tension arm is arranged to preload the driveshafts and the gears of the associated gearboxes. Tension arm 336 may include a load cell 340 to measure the tension in tension arm 336. With reference to the rotorcraft and drive system illustrated in FIGS. 1 and 2, lockout system 300 may include a reduction gearbox lockout and an accessory gearbox lockout.

Swashplate support 355 includes a plurality of blocks 342 and a rigid beam 344 (e.g., bolt) for each adjacent pair 346 of blocks 342. In use, the blocks are arranged in a circular configuration with the rigid beams 344 interconnecting the adjacent blocks 342 in a spaced apart relationship and the circular configuration encircling the main rotor mast, e.g. between the main rotor gearbox and the swashplate. The adjacent blocks are spaced apart to pass wiring and other components of the rotorcraft.

Figure 4:
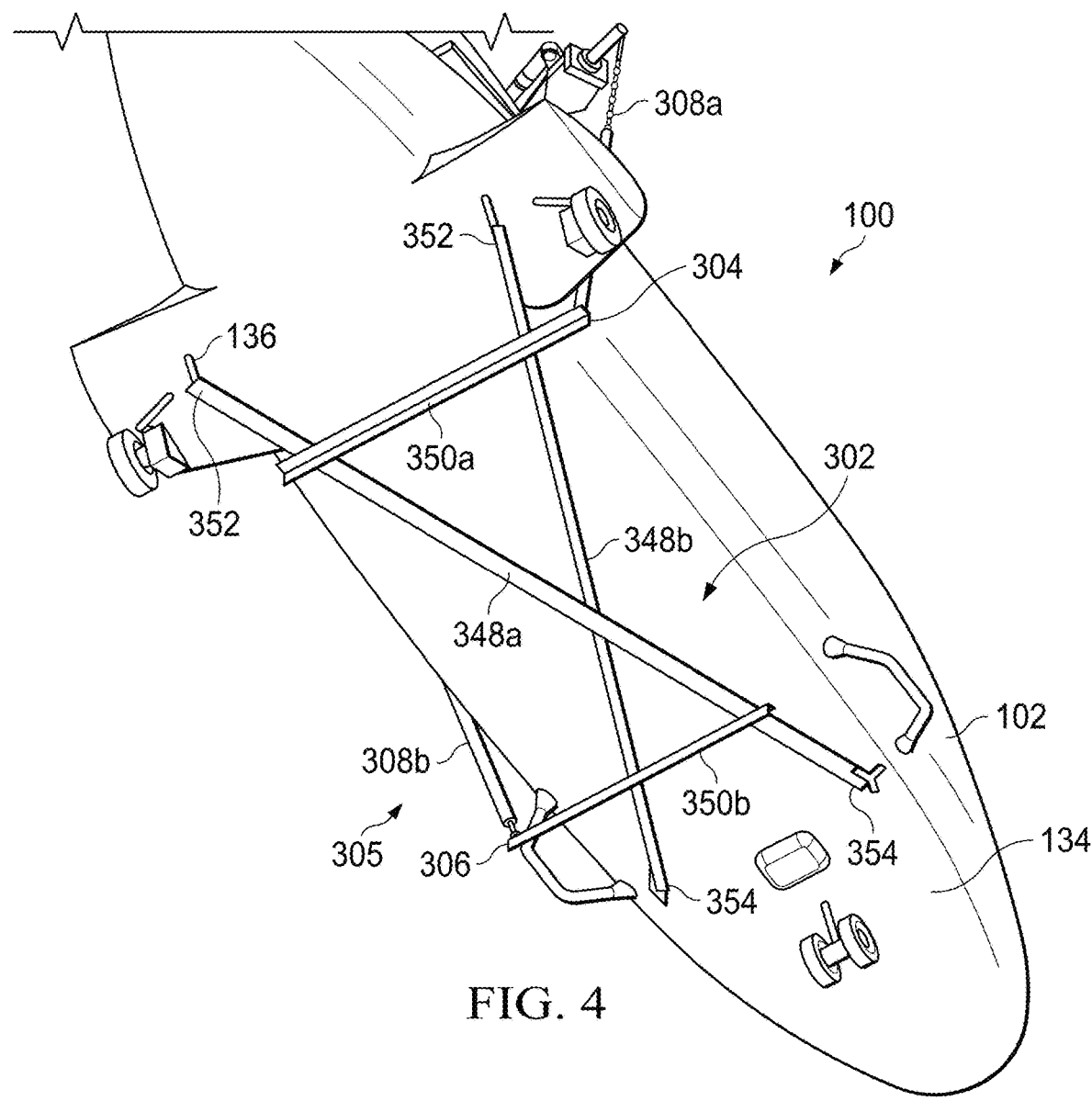
FIG. 4 is a view of a bottom surface of a rotorcraft fuselage illustrating a base of a main rotor lockout mounted on the fuselage according to aspects of the disclosure.
Figure 5:
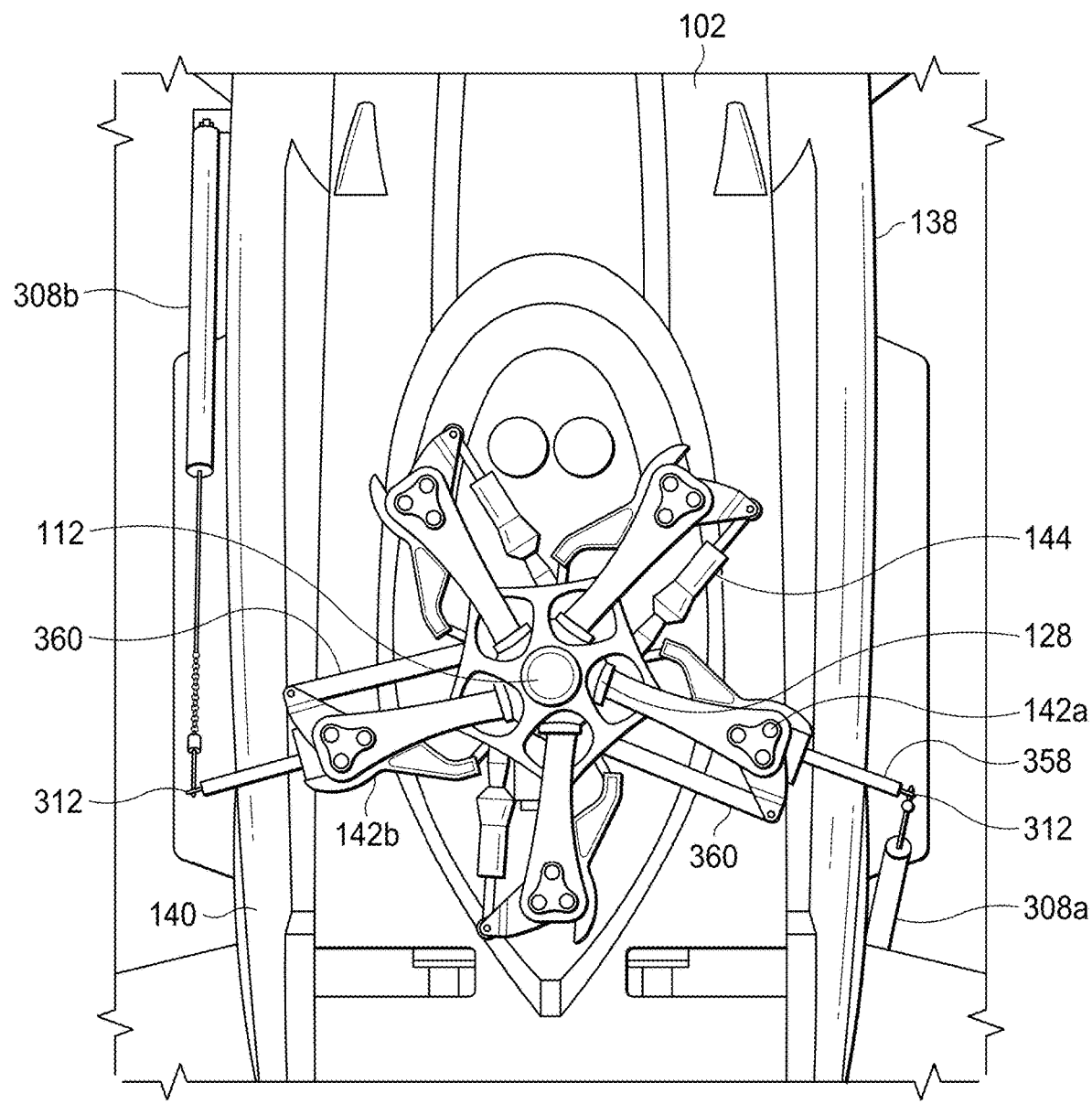
FIG. 5 is a top view illustrating components of a main rotor lockout connected to a main rotor hub on right and left sides of the fuselage.
Figure 6:
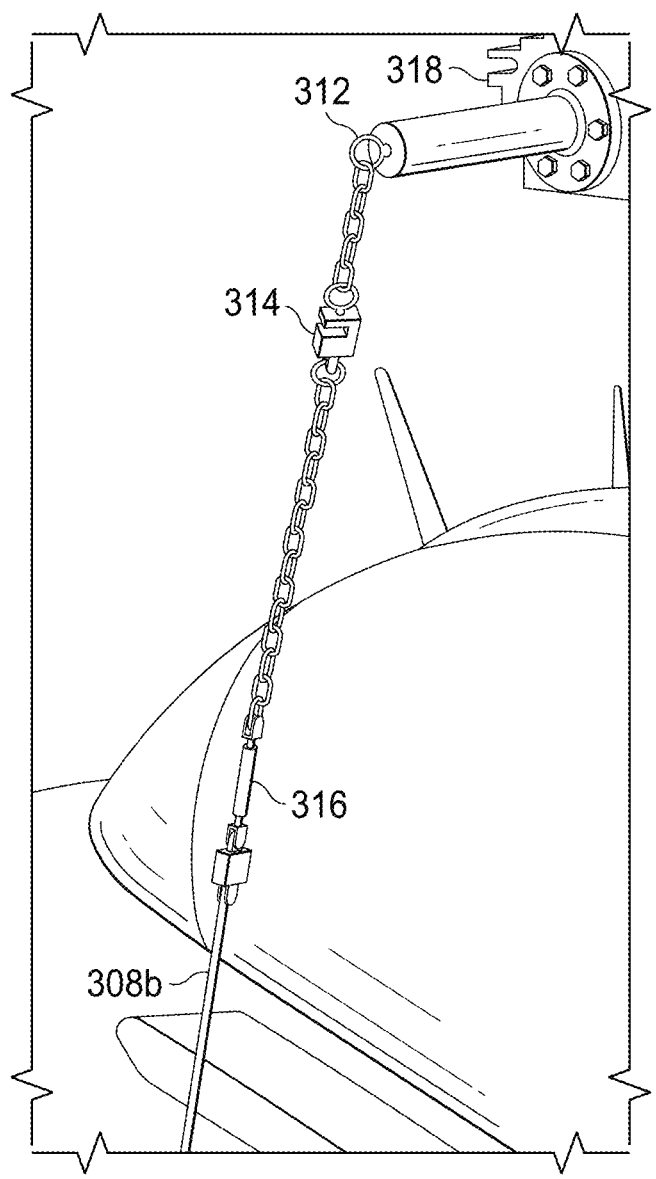
FIG. 6 is a side view illustrating an exemplary component of a main rotor lockout connected to a rotorcraft.

Operation of the main rotor lockout 305 is described with additional reference to FIGS. 4-7. FIG. 4 illustrates base 302 attached to a bottom surface 134 of fuselage 102 of rotorcraft 100. Base 302 includes multiple interconnected structural members 348a, 348b, 350a, 350b. The structural members are rigid members, for example steel angle iron members in the illustrated example. Structural members 348a, 348b, 350a, 350b may be interconnected by removal connectors, e.g., nuts and bolts, and/or by welding. In the illustrated example, base includes cross-members 348a and 348b that intersect proximate their mid-point to form an X-shape. The cross-members 348a, 348b are arranged on the rotorcraft to extend forward and aft of the rotational axis 113 (FIG. 2) of the main rotor mast. First ends 352 of each of cross-members 348a, 348b is connected to bottom surface 134 aft of rotational axis 113 and the opposite ends 354 of cross-members 348a, 348b are attached to bottom surface 134 forward of rotational axis 113. Ends 352 and 354 are attached to jack fittings 136 on the fuselage. Structural members 350a, 350b are laterally extending members relative to fuselage. Structural member 350a extends laterally, side-to-side, aft of main rotor rotational axis 113 with a base end 304 extending beyond a first side 138 of fuselage 102. Structural member 350b extends laterally forward of main rotor rotational axis 113 with a base end 306 extending beyond a second side 140 of fuselage 102 opposite from first side 138. One tension arm 308a is connected to base end 304 and main rotor hub 128 and the second tension arm 308b is connected to base end 306 and the main rotor hub. One of first side 138 and second side 140 is a right side and the other of first side 138 and second side 140 is the left side of the rotorcraft.

Hub end 312 of tension arm 308a is attached to one yoke arm 142a of the rotor hub and hub end 312 of tension arm 308b is attached to another yoke arm 142b. Adapter structures 118 may be utilized to attached hub ends 312 to the rotor hub. Adapter structure 118 includes a block 356 an outboard extending rod 358. Block 356 is connected to the yoke arm. Rod 358 extends outboard to position tension arm 308 away from the fuselage. Hub ends 312 of the tension arms are connected to rods 358. Dampers 144 at yoke arms 142a and 142b are removed and replaced with rigid blanks 360. With tension arms 308a, 308b attached to base 302 and main rotor hub 128 tension adjusting couplers 316 are actuated to apply equal tension through tension arms 308a, 308b. The torque applied to main rotor hub 128 through tension arms 308a, 308b is transmitted through mast 112 to the main rotor gearbox locking the upper end of the main rotor drivetrain.

Figure 7:
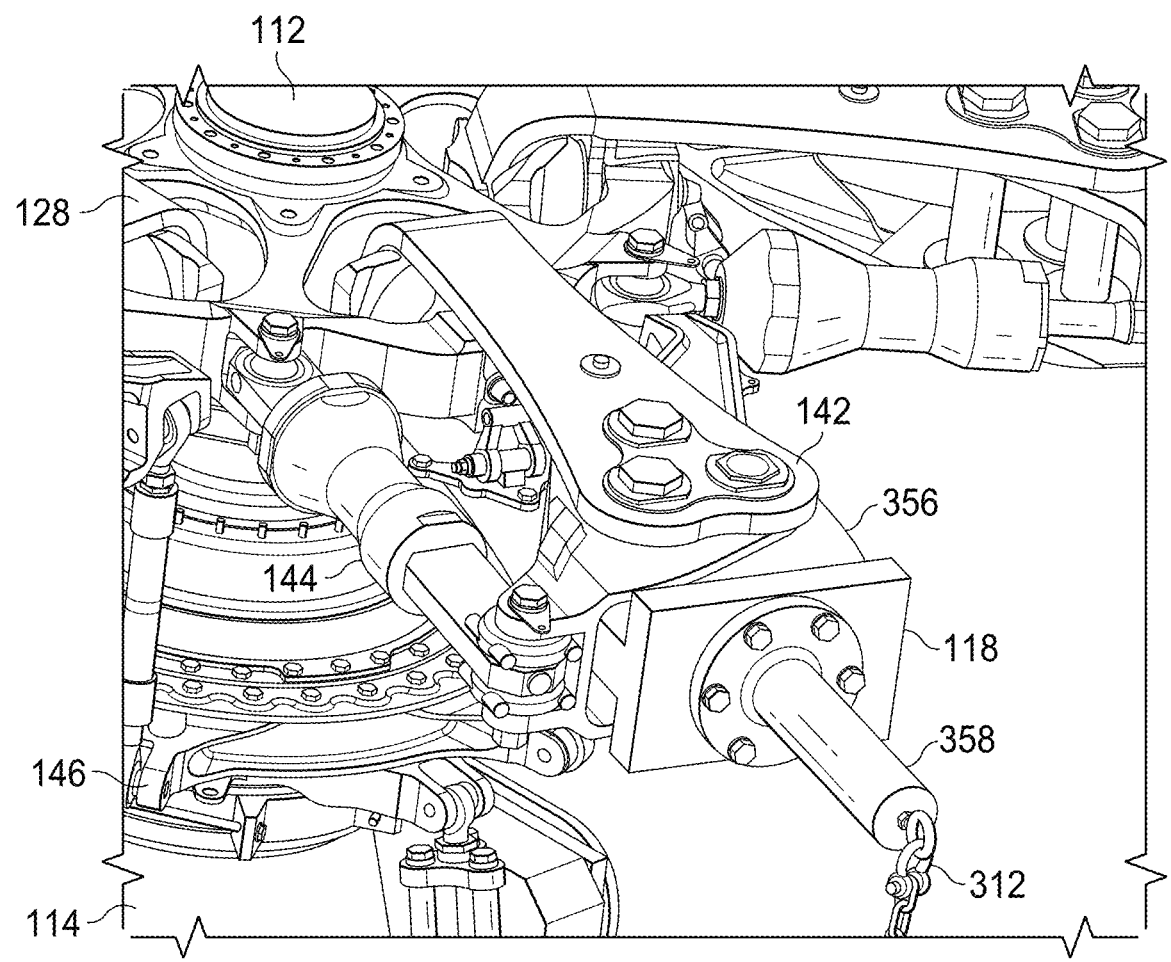
FIG. 7 illustrates an exemplary connection of a component of a main rotor lockout to a main rotor hub according to one or more aspects of the disclosure.
Figure 8:
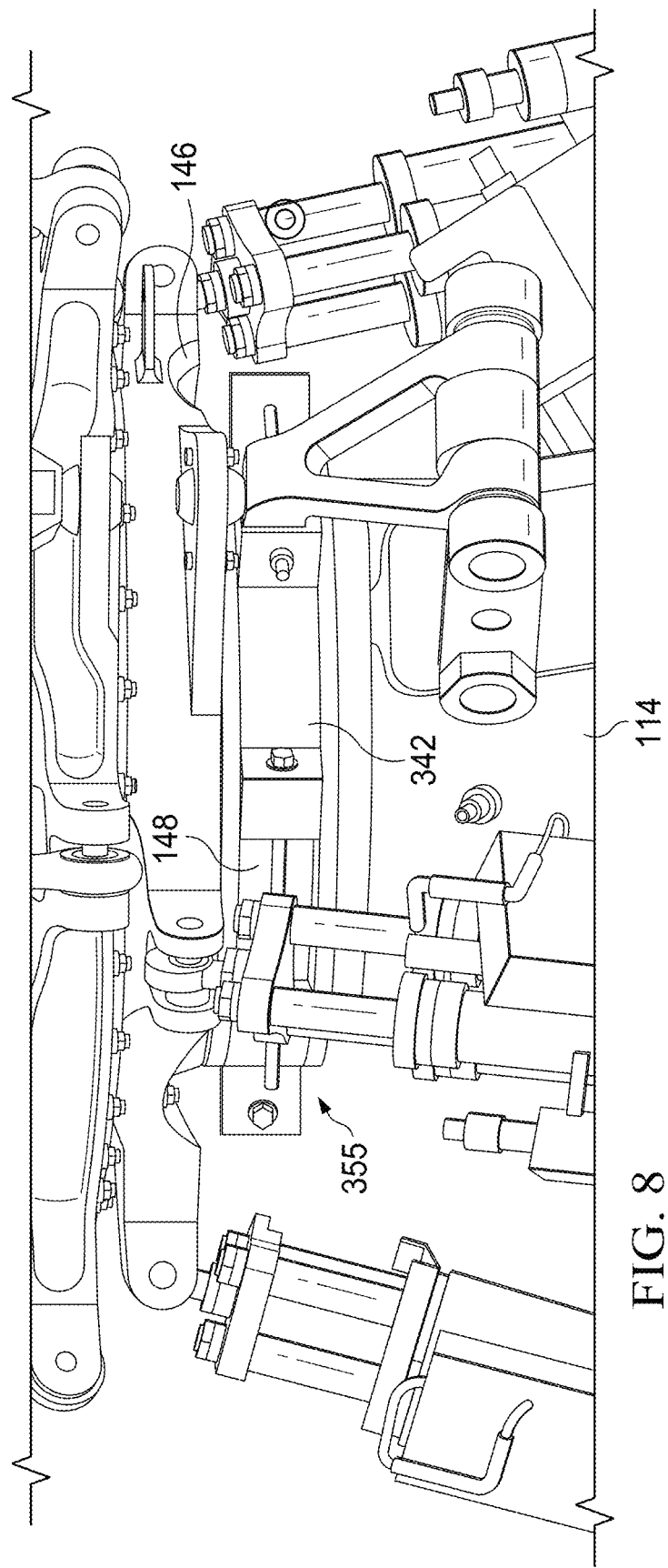
FIG. 8 illustrates an exemplary swashplate support positioned between a swashplate and a main rotor gearbox.

Swashplate support 355 is operationally described with reference in particular to FIGS. 3, 7 and 8. Swashplate support 355 is positioned encircling mast 112, for example around the collective sleeve. Swashplate support 355 is positioned between the swashplate 146 (FIGS. 7, 8) and main rotor gearbox 114. During transport, the hydraulics bleed off allowing the rotor head to lower to the collective sleeve. This is acceptable during shutdown and normal operation; however, damage will occur during transport. Swashplate support 355 prevents the rotor hub components from reaching their travel limits. Straps may be used to secure the unsupported yoke of the main rotor hub to the travel limit stops.

Figure 9:
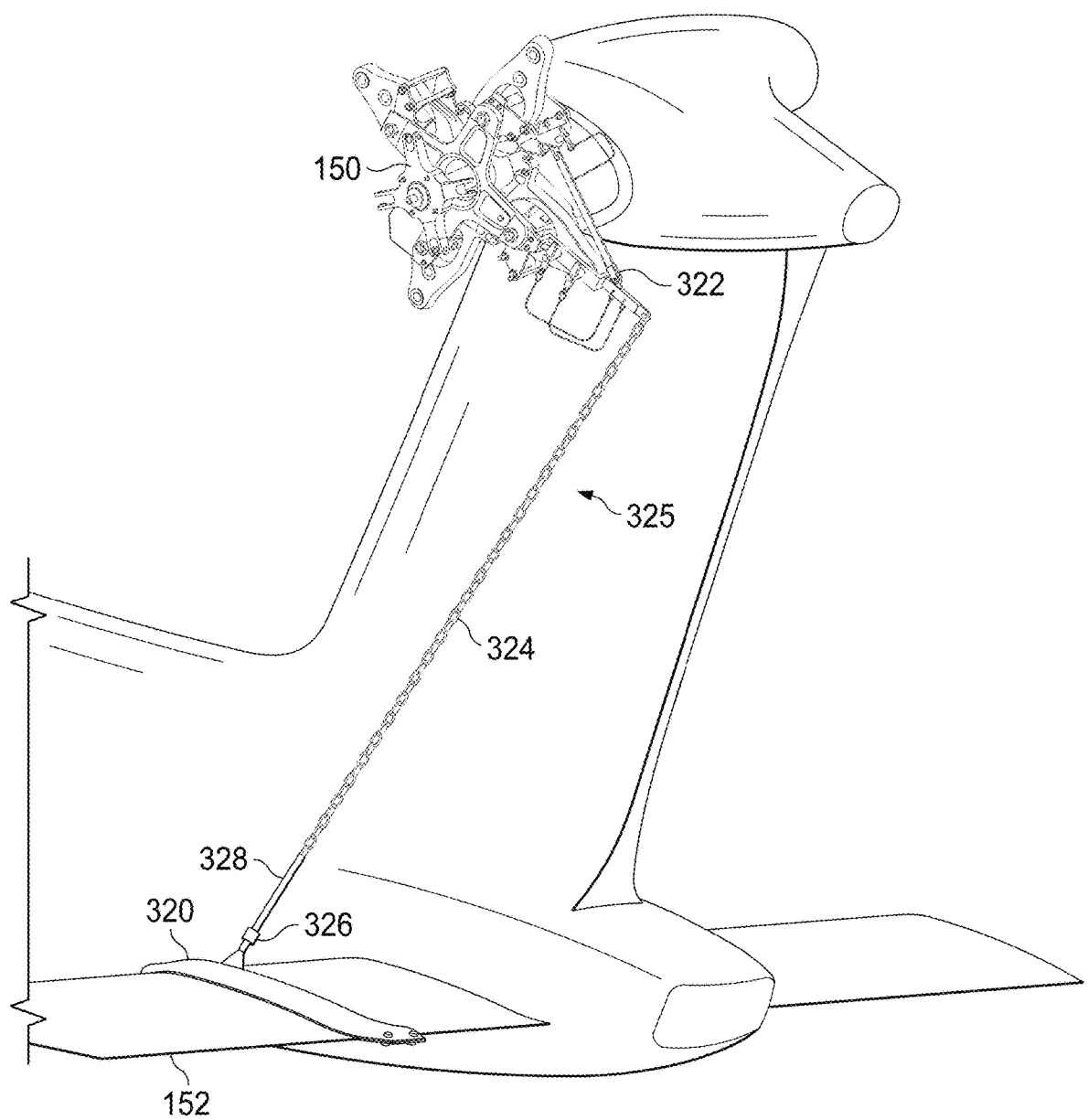
FIG. 9 illustrates an exemplary tail rotor lockout secured to a tail rotor.
Figure 10:
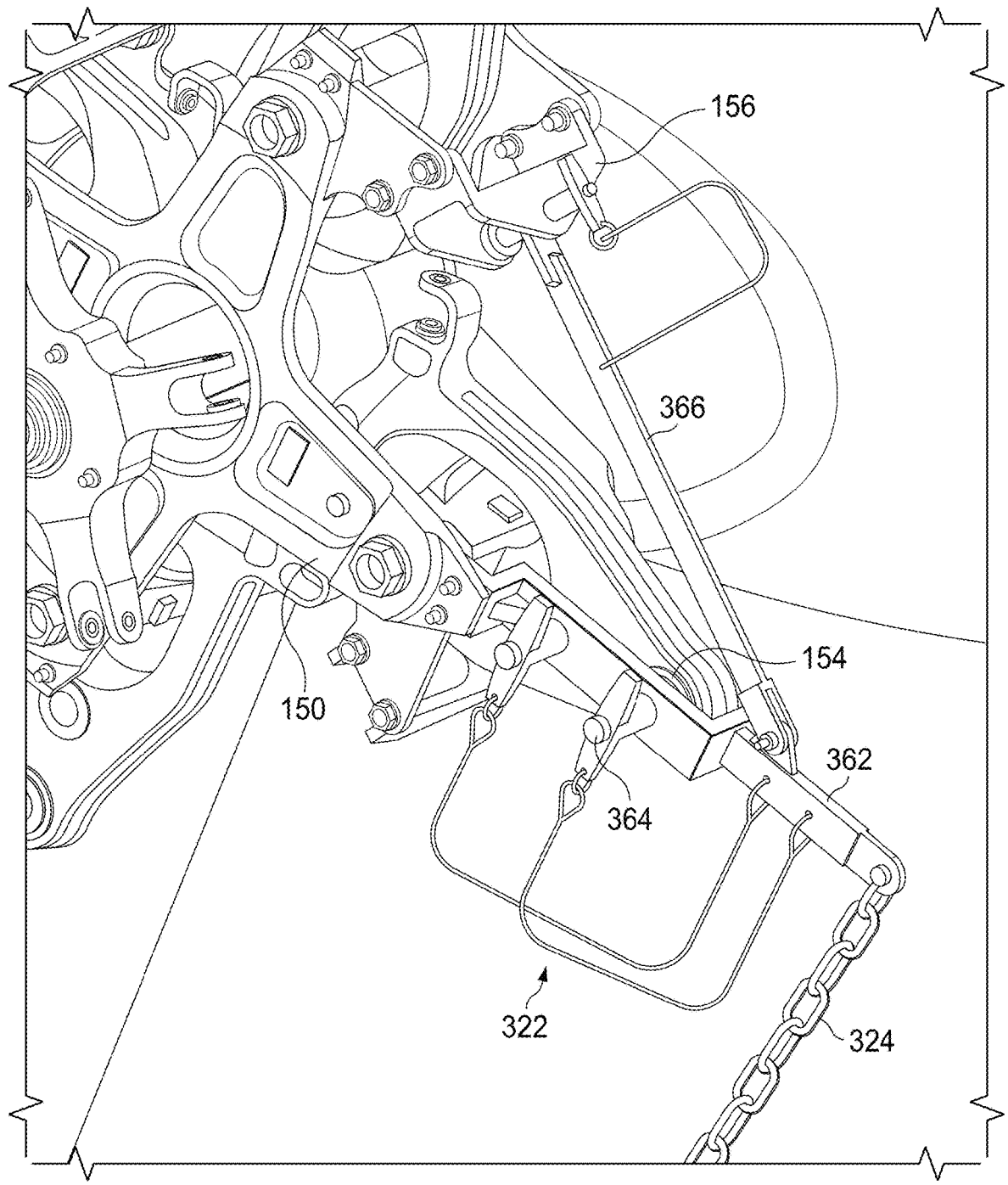
FIG. 10 is an expanded view of an exemplary tail rotor lockout component secured to a tail rotor hub.

Tail rotor lockout 325 is now described with additional reference to FIGS. 9 and 10. Tail rotor lockout 325 is utilized to prevent the tail rotor hub 150 from rotating during transport and provides a lock for the entire drivetrain components between tail rotor gearbox 126 and main rotor gearbox 114 (FIG. 2). As illustrated in FIG. 9, clamp 320 is attached to horizontal stabilizer 152 and rotor arm connector 322 is attached to tail rotor hub 150 in place of a tail rotor blade. Rotor arm connector or tail rotor blade adapter 322 includes a first arm 362 that is connected to hub 150 at a blade attach bolt location 154 with pins 364. A second arm 366 of connector 322 is connected to a damper attach location 156 adjacent to blade attach bolt location 154 overcoming the elastomeric in the tail blade joint. Tension arm 324 is then connected to stabilizer clamp 320 and rotor arm connector 320 and length adjustment coupler 328, e.g. a turnbuckle, is operated to increase the tension in tension arm 324 and apply a reaction force to lock the drivetrain. Load cell 326 indicates the load on the tension arm.

FIG. 11 illustrates an exemplary gearbox lockout 335, also shown in FIG. 3. Gearbox lockout 335 include a pair of clamps 332, 334 and a tension arm 336 to interconnect clamps 332, 334. Each clamp 332, 334 may be sized and shaped to fit and to be secured to a gearbox driveshaft component, such as the attach flanges or quills. Clamps 332, 334 are constructed in two or more sections so that the clamp can be positioned to encircle the gearbox driveshaft component without disassembly of the drive system. For example, clamp 334 is formed in two sections 334a, 334b attached at a pivot pin 158. The opposite ends of clamp sections 334a, 334b are connected by a pin 160, referred to as a quick release pin. Each clamp includes two or more connection points 162, e.g. holes, for attaching tension arm 336. As further described below, clamps 332, 334 are attached to adjacent gearbox driveshaft components by positioning the clamp sections around the component and interconnecting the sections with pin 160. Once clamp 332 and clamp 334 are secured, tension arm 336 is attached to the clamps 332, 334 at accessible connections points 162. Tension arm 336 has a length adjustable coupler 338 that is actuated to apply a load to clamps 332, 334. The adjacent gearbox driveshafts rotate in opposite directions and tension arm 336 preloads the driveshafts and the gears of the associated gearboxes. Tension arm 336 may include a load cell 340 to measure the tension in tension arm 336.

Figure 12:
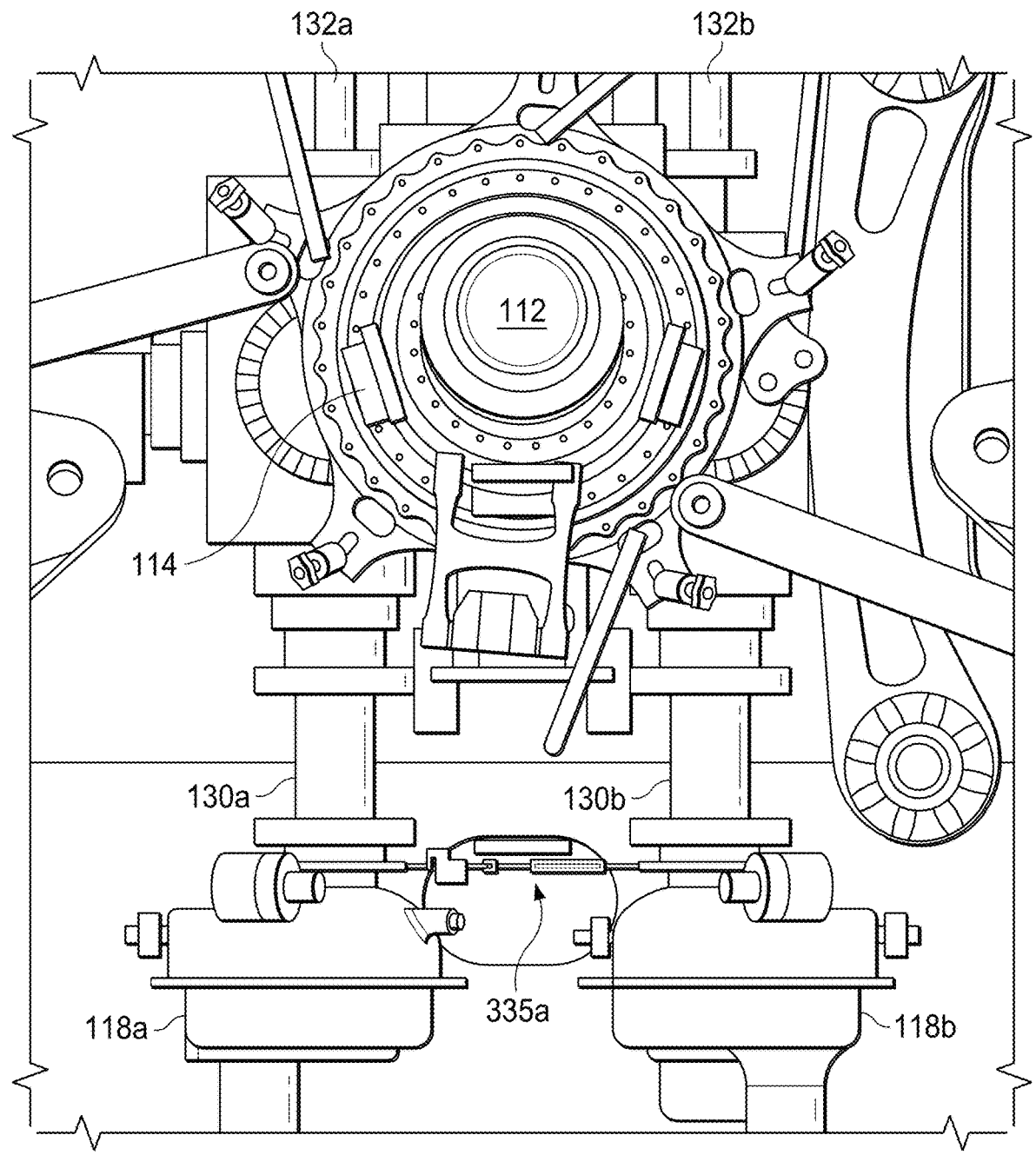
FIG. 12 is a top view a main rotor gearbox and adjacent engine reduction gearboxes illustrating an exemplary connection of reduction gearbox lockout to adjacent main rotor gearbox input driveshaft components.
Figure 13:
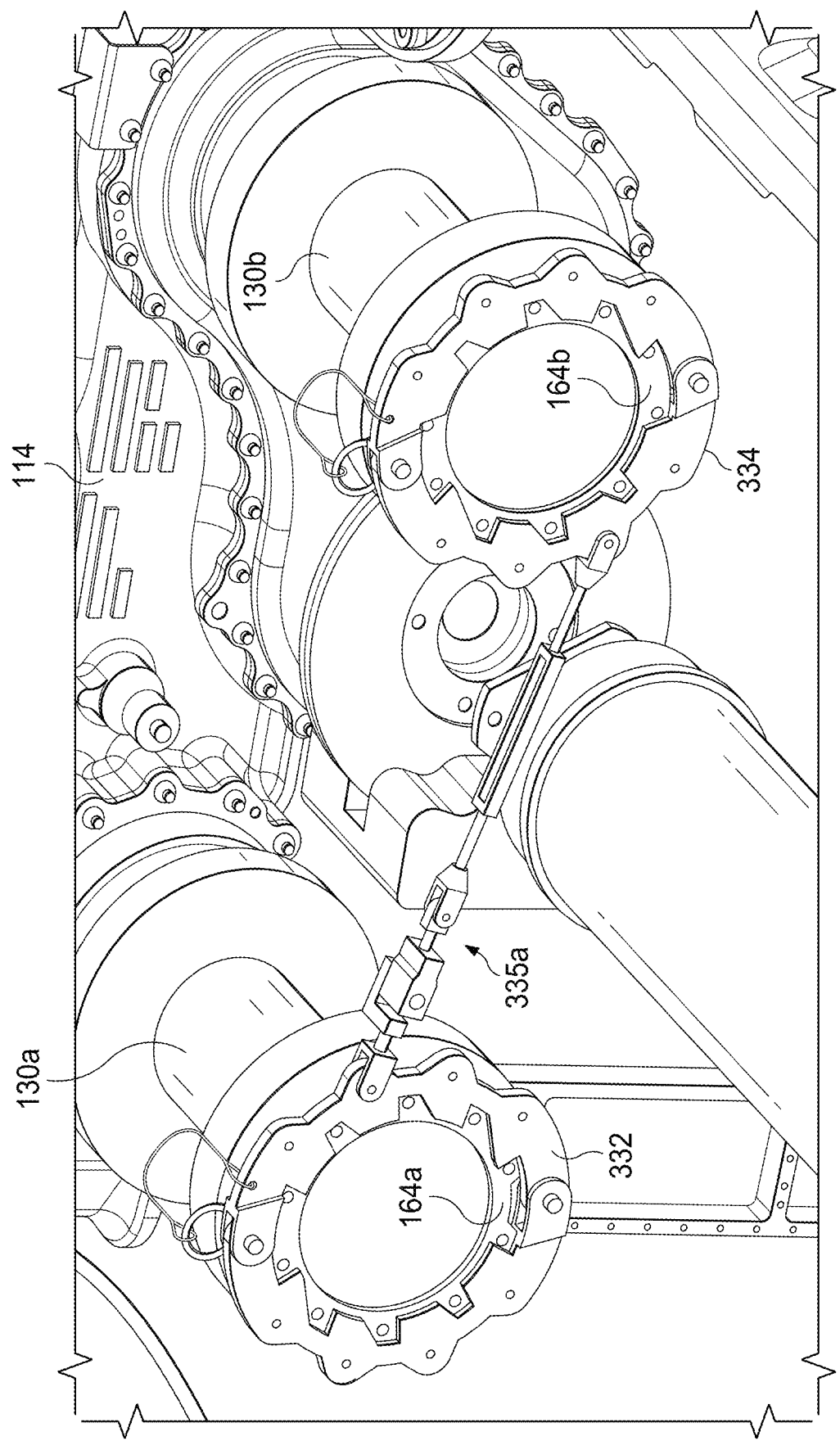
FIG. 13 illustrates an exemplary connection of a reduction gearbox lockout to adjacent reduction gearbox driveshaft components.

FIGS. 12 and 13 illustrate a reduction gearbox lockout 335a secured to driveshafts 130a, 130b between reduction gearboxes 118a, 118b and MRGB 114. The reduction gearboxes are removed from FIG. 13 to illustrate the exemplary connection of the reduction gearbox lockout 335a to the driveshaft components. In this example, clamp 332 and clamp 334 are attached to the flange 164a, 164b connections between driveshafts 130a, 130b and the reduction gearbox output flanges. The adjacent gearbox driveshafts 130a, 130b rotate in opposite directions and the tension arm is arranged to preload the driveshafts and the gears of the reduction gearboxes. The direction of pull of the tension arm prevents rotation of the reduction gearbox gears preloading the reduction gearbox gears and the main rotor gearbox gears driving the gearbox gears simultaneously. The reduction gearbox lockout locks the reduction gearboxes and prevents gear chatter during transport.

Figure 14:
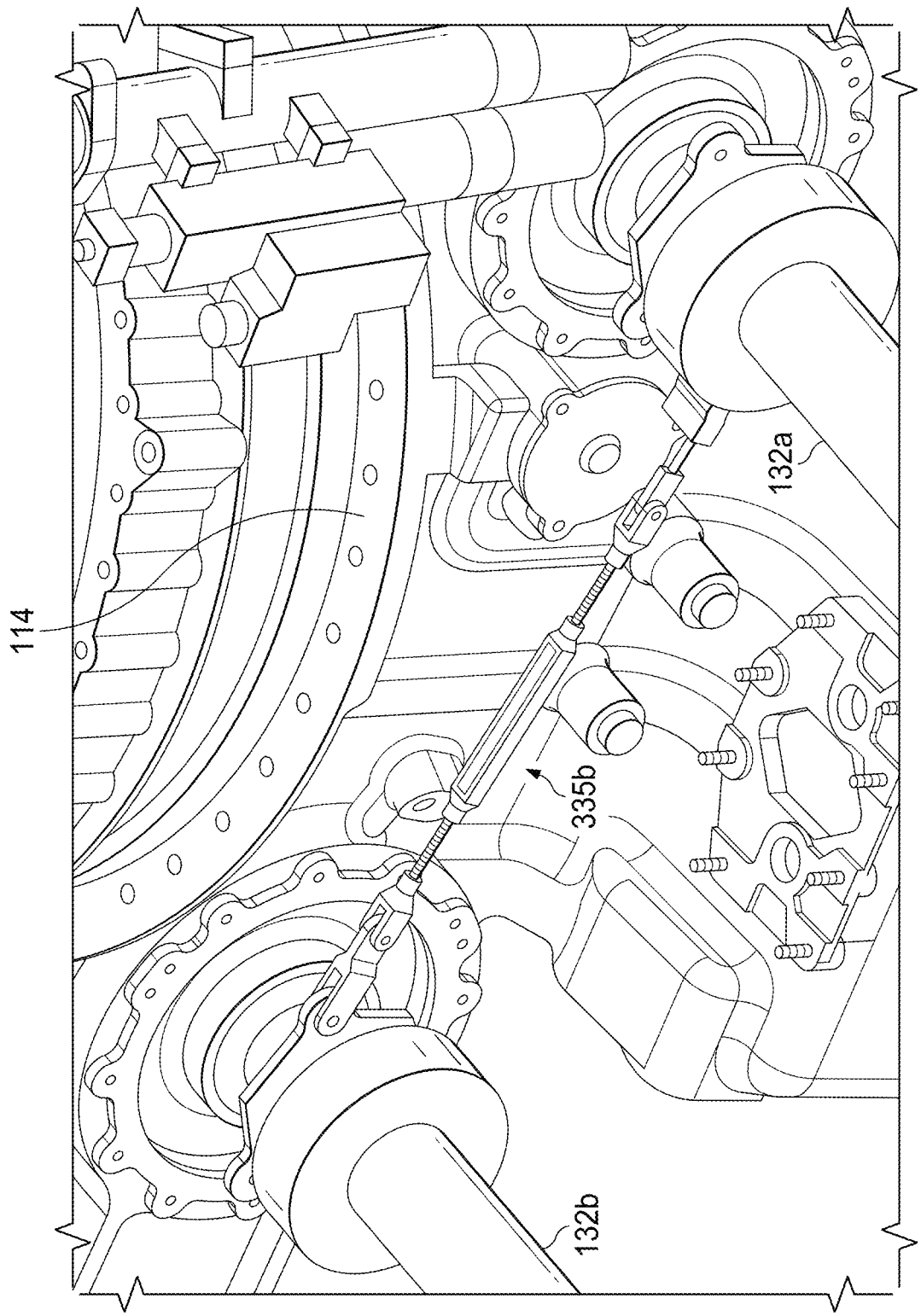
FIG. 14 illustrates an exemplary connection of an accessory gearbox lockout to adjacent driveshafts between accessory gearboxes and the main rotor gearbox.
Figure 15:
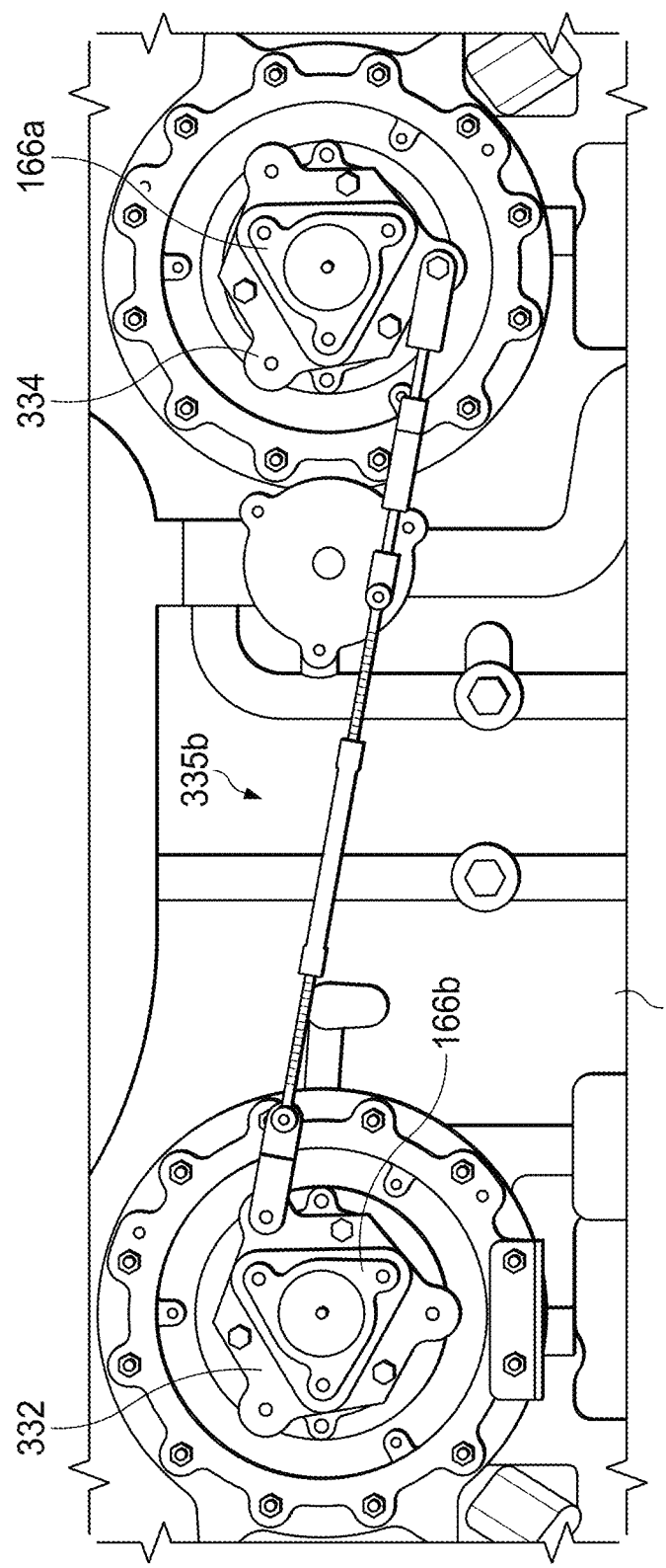
FIG. 15 illustrates an exemplary connection of an accessory gearbox lockout to accessory driveshaft attach flanges at the main rotor gearbox.

FIGS. 14 and 15 illustrate an accessory gearbox lockout 335b connected to driveshafts 132a, 132b between main rotor gearbox 114 and accessory gearboxes 116a, 116b (FIG. 2). In FIG. 15, the accessory gearboxes and accessory driveshafts are removed to show the exemplary connection to the driveshaft attach flanges 166a, 166b. In this example, clamp 332 is secured to driveshaft attach flange 166b and clamp 334 is secured to driveshaft attach flange 166a. Adjacent gearbox driveshafts 132a, 132b rotate in opposite directions and the tension arm is arranged to preload the driveshafts and the gears of the accessory gearboxes. The direction of pull of the tension arm prevents rotation of the accessory gearboxes, locks the accessory portion of the drivetrain, and prevents gear chatter.

An exemplary method for locking rotors and a drivetrain for transport of a rotorcraft described with reference to FIGS. 1-14, includes securing a main rotor, securing a tail rotor, and locking first and second gearboxes, such as a reduction gearbox or an accessory gearbox. Securing the main rotor includes attaching a base to a bottom surface of the fuselage with a right end extending beyond a right side of the fuselage and a left end extending beyond a left side of the fuselage and one of the right end and the left end positioned forward of the mast and the other one of the right end and the left end positioned aft of the mast, connecting a first tension arm to the right end and to the main rotor hub, connecting a second tension arm to the left end and to the main rotor hub, and applying an equal load through the first tension arm and the second tension arm.

Locking the first and second gearboxes includes securing a first clamp to the first gearbox driveshaft, securing a second clamp to the second gearbox driveshaft, and interconnecting the first and the second clamps in tension.

Securing the tail rotor includes attaching tail rotor clamp to a horizontal stabilizer, attaching a tension arm to the tail rotor clamp and the tail rotor hub, and applying tension to the tail rotor hub in an opposite direction of rotation of the tail rotor hub.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotorcraft lockout system comprising:
a main rotor lockout comprising a base operable to be attached to a bottom surface of a fuselage of a rotorcraft;
a first tension arm having a first base end attachable to the base, a first hub end connectable to a main rotor hub, and a length adjustable coupler; and
a second tension arm having a second base end attachable to the base, a second hub end connectable to the main rotor hub, and a length adjustable coupler; and
a tail rotor lockout comprising:
a clamp operable to connect to a horizontal stabilizer of the rotorcraft;
a rotor arm connector operable to connect to a tail rotor hub; and
a tail rotor tension arm operable to interconnect the clamp and the rotor arm connector, the tail rotor tension arm comprising a load cell and a length adjustable coupler.

2. The rotorcraft lockout system of claim 1, wherein the first and the second tension arms each comprises a load cell.

3. The rotorcraft lockout system of claim 1, wherein the first hub end and the second hub end each comprises a member attachable to the main rotor hub and a rod extending away from the member to position the first and second tension arms away from the fuselage.

4. The rotorcraft lockout system of claim 1, further comprising a gearbox lockout comprising a tension arm interconnecting a first clamp and a second clamp, the first and second clamps operable to connect to adjacent gearbox driveshafts components.

5. The rotorcraft lockout system of claim 4, wherein the first and the second clamps each comprise semi-circular portions selectively connectable to one another to form an enclosed circular clamp.

6. The rotorcraft lockout system of claim 4, wherein the tension arm of the gearbox lockout comprises a load cell and a length adjustable coupler.

7. The rotorcraft lockout system of claim 1, wherein the rotor arm connector includes a first arm operable to connect to the tail rotor hub at a blade attach location and a second arm operable to connect to a damper attach location.

8. The rotorcraft lockout system of claim 1, further comprising a swashplate support including a plurality of blocks and a rigid beam for each adjacent pair of blocks, the swashplate support operable to be arranged in a circular configuration with the rigid beams interconnecting the adjacent pair of blocks with the swashplate support encircling a rotor mast between a swashplate and a main rotor gearbox.

9. The rotorcraft lockout system of claim 8, further comprising a gearbox lockout comprising a tension arm interconnecting a first clamp and a second clamp, the first and second clamps operable to connect to adjacent gearbox driveshaft components.

10. A rotorcraft comprising:
a fuselage;
a main rotor gearbox (MRGB) connected by a mast to a main rotor hub;
a swashplate connected to the main rotor hub;
a first reduction gearbox (RGB) connecting a first engine to the MRGB through a first RGB driveshaft;
a second RGB connecting a second engine to the MRGB through a second RGB driveshaft;
a tail rotor hub connected to the MRGB through a tail rotor driveshaft;
a tail rotor lockout comprising a clamp secured to a horizontal stabilizer, a rotor arm connector secured to the tail rotor hub, and a tension arm interconnecting the clamp and the rotor arm connector in tension;
a reduction gearbox lockout comprising a first RGB clamp secured to the first RGB driveshaft and a second RGB clamp secured to the second RGB driveshaft and a RGB tension link interconnecting the first and the second RGB clamps in tension; and
a main rotor lockout comprising:
a base connected to a bottom surface of the fuselage, the base comprising a right end extending beyond a right side of the fuselage and a left end extending beyond a left side of the fuselage, one of the right end and the left end is positioned forward of the mast and the other one of the right end and the left end is positioned aft of the mast;
a first tension arm having a first base end connected to the right end and a first hub end connected to the main rotor hub; and
a second tension arm having a second base end connected to the left end and a second hub end connected to the main rotor hub.

11. The rotorcraft of claim 10, wherein the RGB tension link, the first tension arm, and the second tension arm each comprise a load cell and a length adjustable coupler.

12. The rotorcraft of claim 11, wherein the first and second RGB clamps each comprise semi-circular portions selectively connectable to one another to form an enclosed circular clamp.

13. The rotorcraft of claim 10, further comprising a swashplate support encircling the mast and positioned between the swashplate and the main rotor gearbox, the swashplate support comprising a plurality of blocks arranged in a circular configuration.

14. The rotorcraft of claim 10, further comprising:
a first accessory gearbox (AGB) connected to the MRGB by a first AGB driveshaft;
a second AGB connected to the MRGB by a second AGB driveshaft; and
an accessory gearbox lockout comprising a first AGB clamp secured to the first AGB driveshaft and a second AGB clamp secured to the second AGB driveshaft and an AGB tension link interconnecting the first and the second AGB clamps in tension.

15. The rotorcraft of claim 14, wherein the AGB tension link, the RGB tension link, the first tension arm, and the second tension arm each comprise a load cell and a length adjustable coupler.

16. The rotorcraft of claim 15, wherein the first and second AGB clamps and the first and second RGB clamps, each comprise semi-circular portions selectively connectable to one another to form an enclosed circular clamp.

17. The rotorcraft of claim 10, wherein the rotor arm connector includes a first arm connected to the tail rotor hub at a blade attach location and a second arm connected to a damper attach location adjacent to the blade attach location.

18. A method for locking rotors and a drivetrain for transport of a rotorcraft comprising a fuselage, a main rotor gearbox (MRGB) connected to a main rotor hub by a mast, a swashplate connected to the main rotor hub, a tail rotor hub connected to the MRGB through a tail rotor driveshaft coupled to an intermediate gearbox and a tail rotor gearbox, a first reduction gearbox (RGB) connecting a first engine to the MRGB through a first RGB driveshaft, a second RGB connecting a second engine to the MRGB through a second RGB driveshaft, a first accessory gearbox (AGB) connected to the MRGB by a first AGB driveshaft, and a second AGB connected to the MRGB by a second AGB driveshaft, the method comprising:
- securing a main rotor comprising:
  - attaching a base to a bottom surface of the fuselage with a right end extending beyond a right side of the fuselage and a left end extending beyond a left side of the fuselage and one of the right end and the left end positioned forward of the mast and the other one of the right end and the left end positioned aft of the mast;
  - connecting a first tension arm to the right end and to the main rotor hub;
  - connecting a second tension arm to the left end and to the main rotor hub; and
  - applying an equal load through the first tension arm and the second tension arm;
- locking the first and second RGB s comprising:
  - securing a first RGB clamp to the first RGB driveshaft;
  - securing a second RGB clamp to the second RGB driveshaft; and
  - interconnecting the first and the second RGB clamps in tension;
- locking the first and second AGBs comprising:
  - securing a first AGB clamp to the first AGB driveshaft;
  - securing a second AGB clamp to the second AGB driveshaft; and
  - interconnecting the first and the second AGB clamps in tension; and
- securing a tail rotor (TR) comprising:
  - attaching a TR clamp to a horizontal stabilizer;
  - attaching a TR tension arm to the TR clamp and the TR hub; and
  - applying tension through the TR tension arm to the TR hub in an opposite direction of rotation of the TR hub.

19. The method of claim 18, further comprising a positioning a swashplate support encircling the mast between the swashplate and the main rotor hub.

20. The method of claim 18, wherein TR tension arm is attached to the tail rotor hub with a rotor arm connector having a first arm connected to the tail rotor hub at a blade attach location and a second arm connected to a damper attach location.

* * * * *